(12) United States Patent
Klipstein et al.

(10) Patent No.: US 7,053,564 B2
(45) Date of Patent: May 30, 2006

(54) BALLAST FOR A DISCHARGE LAMP

(75) Inventors: Ulrich Klipstein, Wendeburg (DE); Norbert Unzner, Dettum (DE); Wilfried Brauckmann, Wendeburg (DE)

(73) Assignee: B & S Elektronische Geräte GmbH, Braunschweig (DE)

( * ) Notice: Subject to any disclaimer, the term of this patent is extended or adjusted under 35 U.S.C. 154(b) by 0 days.

(21) Appl. No.: 10/507,173

(22) PCT Filed: Mar. 6, 2003

(86) PCT No.: PCT/DE03/00786

§ 371 (c)(1), (2), (4) Date: Sep. 10, 2004

(87) PCT Pub. No.: WO03/077614

PCT Pub. Date: Sep. 18, 2003

(65) Prior Publication Data

US 2005/0212457 A1    Sep. 29, 2005

(30) Foreign Application Priority Data

Mar. 12, 2002  (DE)  ............................... 102 10 805

(51) Int. Cl.
*H05B 37/02*    (2006.01)

(52) U.S. Cl. ...................... 315/291; 315/246; 315/245; 315/224

(58) Field of Classification Search ................ 315/224, 315/246, 219, 225, 245, 291
See application file for complete search history.

(56) References Cited

U.S. PATENT DOCUMENTS

| | | | | |
|---|---|---|---|---|
| 4,134,044 A | * | 1/1979 | Holmes | 315/209 R |
| 5,185,560 A | * | 2/1993 | Nilssen | 315/219 |
| 5,233,273 A | * | 8/1993 | Waki et al. | 315/224 |
| 5,399,944 A | * | 3/1995 | Konopka et al. | 315/219 |
| 5,828,185 A | * | 10/1998 | Fellows et al. | 315/246 |
| 5,998,939 A | * | 12/1999 | Fellows et al. | 315/246 |
| 6,002,210 A | * | 12/1999 | Nilssen | 315/219 |
| 6,667,585 B1 | * | 12/2003 | O'Meara | 315/291 |
| 6,680,585 B1 | * | 1/2004 | Trestman | 315/291 |

(Continued)

FOREIGN PATENT DOCUMENTS

DE    29921144 U1    12/1999

(Continued)

*Primary Examiner*—Wilson Lee
*Assistant Examiner*—Binh Van Ho
(74) *Attorney, Agent, or Firm*—Whitham, Curtis, Christofferson, & Cook, PC

(57) ABSTRACT

The invention relates to ballast for a discharge lamp (16), comprising a direct-current supply phase (2), semiconductor switches (10, 11), operated at a high-frequency clock frequency for modifying the direction of current through the discharge lamp (16), an ignition transformer (15), which can be supplied with the direct current of the direct-current supply phase (2) via a series capacitor (14) and a choke inductance (17) that is connected to an electrode of the discharge of the discharge lamp (16), said electrode not being connected to the ignition transformer (15). To increase the ignition reliability of the discharge lamp (16), a capacitor (24), connected in series to a switch (23), is connected between a junction point (27) of the series capacitor (14) and ignition transformer (15) on one side and a junction point (26) between the discharge lamp (16) and the choke inductance (17) on the other side, and the capacitor (24) and the choke inductance (17) form a series resonant circuit that is tuned to a higher harmonic of the clock frequency.

3 Claims, 1 Drawing Sheet

Figure 1:
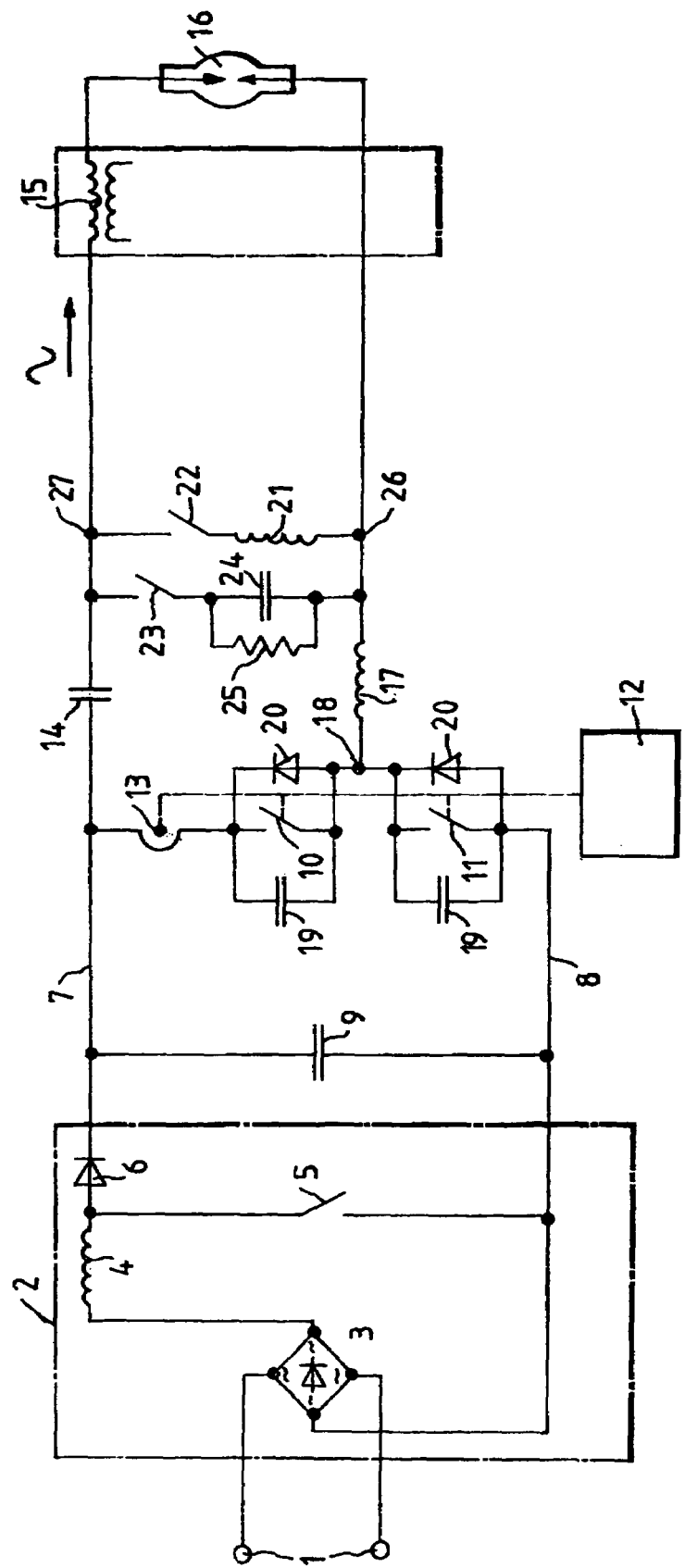

U.S. PATENT DOCUMENTS 6,683,418 B1 * 1/2004 Shoji et al. .................. 315/224

FOREIGN PATENT DOCUMENTS

| EP | 0078864 | | 5/1983 |
| EP | 0477621 | A1 | 4/1992 |
| EP | 0739154 | A1 | 10/1996 |
| WO | WO 00/30413 | | 11/1999 |

* cited by examiner

BALLAST FOR A DISCHARGE LAMP

This application is a 371 of PCT/DE03/00786 filed Mar. 6, 2003.

The invention relates to a ballast device for a discharge lamp, having a DC voltage supply stage, semiconductor switches which are switched at a radiofrequency clock frequency for the purpose of changing the current direction through the discharge lamp, a starting transformer, to which the DC voltage of the DC voltage supply stage can be supplied via a series capacitor, and a ballast inductance which is connected to an electrode, not connected to the starting transformer, of the discharge lamp.

Numerous embodiments are known for ballast devices for discharge lamps, such as arc lamps. The common factor with these ballast devices is the fact that the current direction of the ignited arc in the discharge lamp needs to be changed continuously in order to prevent one of the electrodes being exhausted at one end.

It is known for the current direction to be reversed even at a very high clock frequency of, for example, 300 to 400 kHz. In this case, resonance phenomena in the discharge lamp are reliably prevented, since resonances of the discharge lamps are at markedly lower frequencies. Radiofrequency clocking makes it possible for the ballast device to be small in size, since comparatively low inductances are required. Furthermore, the ballast device run quietly and largely without any harmonics.

The DC voltage is supplied from the DC voltage supply stage, which is preferably in the form of a step-up converter, via a series capacitor which is required for recharging purposes for the change in current direction. The series capacitor is dimensioned such that approximately half the voltage supplied from the DC voltage supply stage is present across it, with the result that, in practice, the output voltage of a step-up converter of 370 V downstream of the series capacitor is halved to approximately 185 V, with the result that only half the voltage through the primary winding of the starting transformer reaches the discharge lamp. The starting transformer which is used for stepping up the voltage of radiofrequency pulses supplied separately to it for the starting operation, produces, on the secondary side, voltage pulses of, for example, 25 kV, which bring about ionization of the discharge path in the discharge lamp. The voltage supplied to the discharge lamp from the DC voltage supply stage is under certain circumstances insufficient to ensure reliable starting (ignition) of the discharge lamp. In practice, under certain circumstances numerous starting attempts therefore need to be undertaken in order to bring about the desired operation for the discharge lamp.

The invention is based on the object of improving the starting of the discharge lamp using simple means whilst retaining the function of a ballast device which is subject to radiofrequency clocking.

For the purpose of achieving this object, a ballast device of the type mentioned initially is characterized, according to the invention, in that, between a connecting point between the series capacitor and the starting transformer, on the one hand, and a connecting point between the discharge lamp and the ballast inductance, on the other hand, a capacitor is connected in series with a switch, and in that the capacitor forms, with the ballast inductance, a series resonant circuit which is tuned to a higher harmonic of the clock frequency.

Owing to the series resonant circuit, which is effectively switched only for the starting operation by means of the switch which is connected in series with it, the AC voltage produced by radiofrequency clocking is superimposed by a harmonic which significantly increases the voltage produced across the lamp during and after the discharge introduced by a high-voltage pulse from the starting transformer, with the result that the arc is formed with greater reliability.

Since the series resonant circuit is tuned to a harmonic of the clock frequency, care must be taken to ensure that no sharp resonant peak due to a high quality factor occurs which could result in the semiconductor switch being destroyed by an overcurrent. For the purpose of making use of an increase in the voltage without the risk of a too high resonant peak, according to the invention, the series resonant circuit is tuned to a higher harmonic. As is known, this reduces the effect of resonance-induced, excessive increase in current.

In practical embodiments, it has proven particularly successful to tune to the fifth harmonic, but in some cases also to the third harmonic of the clock frequency. It is therefore preferred to tune the series resonant circuit to a resonant frequency which lies between the third and the sixth harmonic of the clock frequency.

The invention will be explained in more detail below with reference to an exemplary embodiment illustrated in the drawing.

The drawing shows a schematic circuit diagram of an embodiment of a ballast according to the invention.

Connected to the terminals 1 of a system voltage (220 V) is a DC voltage supply stage 2 in the form of a step-up converter. Illustrated schematically is a rectifier bridge 3, a longitudinal inductance 4 and a parallel-connected switch 5 and a diode at a positive output of the DC voltage supply stage 2. The DC voltage output by the DC voltage supply stage 2 on two output lines 7, 8 is present in smoothed form across a smoothing capacitor 9, connected between these lines 7, 8. Connected in parallel with the capacitor is a series circuit comprising two semiconductor switches 10, 11. The two semiconductor switches 10, 11 are switched on and off alternately at a frequency of 300 to 400 kHz by a control circuit 12, the switching frequency being regulated as a function of the current flowing through the respectively closed semiconductor switch 10, 11 and measured using a current sensor 13, in order thus to produce a constant current. The output line 7 carrying the positive DC voltage is connected to an electrode of a discharge lamp 16 via a capacitor 14 and a starting transformer 15. The other electrode of the discharge lamp 16 is connected to a connecting point 18 between the two semiconductor switches 10, 11 via a series-connected ballast inductance 17. The capacitor 14 is dimensioned such that approximately half the supplied DC voltage is present across it. As a result, approximately half the voltage which is present across the smoothing capacitor 9 is present across the discharge lamp 16. The change in current direction through the discharge lamp 16 which is brought about by the semiconductor switches 10, 11 results in only a slight increase or decrease in this half voltage which thus remains essentially constant apart from small fluctuations in the switching clock of the semiconductor switches 10, 11. It is thus only the direction of the current through the discharge lamp 16 which is changed.

In order to prevent switching losses of the semiconductor switches 10, 11 when the previously closed semiconductor switch 10, 11 is opened, whilst the other, previously open semiconductor switch 10, 11, is likewise still open (non-conducting) for a short period of time in order to prevent a short-circuit current, parallel circuits comprising in each case a capacitor 19 and a diode 20, connected back-to-back in parallel, are connected in parallel with the two semiconductor switches 10, 11. The capacitor 19 discharged by the closed, associated semiconductor switch 10, 11 is charged when the associated semiconductor switch 10, 11 is opened, and thus half of the current carried by the semiconductor switch 10, 11 when the semiconductor switch 10, 11 is opened is transferred to the inductor 17, with the result that the switch-off losses in this semiconductor switch 10, 11 are considerably reduced. The capacitor 19 connected in parallel with the previously open semiconductor switch 10, 11 is charged at the switching time to the input voltage, and the second half of the current is transferred to it, as a result of which it is discharged, with the result that this semiconductor switch 10, 11 is subsequently switched on with no voltage applied and thus in a loss-free manner. Moreover, the load-relief current flows through the lamp circuit, i.e. the ballast inductance 17, the lamp 16, the starting transformer 15 and the capacitor 14.

For the case in which the lamp is defective and does not start or is inadvertently not inserted in the associated fitting at all, the load-relief current can thus not flow.

In order to nevertheless ensure effective load relief of the semiconductor switches 10, 11, an auxiliary inductance 21 in series with a switch 22 is connected in parallel with the arrangement comprising the lamp 16 and the starting transformer 15, i.e. between the circuit points 26, 27.

The switch 22 is closed, controlled by suitable sensors, as soon as the voltage between the circuit points 26 and 27 approaches a no-load voltage of approximately 185 V. As a result, a current which ensures the above-described recharging of the capacitors 19, connected in parallel with the semiconductor switches 10, 11, flows through the auxiliary inductance 21 in place of the lamp current. The switch 22 is opened as soon as a lamp current of a specific value is sensed.

This ensures that, during normal operation of the lamp 16, the operation of the ballast is not altered by the auxiliary inductance but that the auxiliary inductance 21 is effective only under no-load conditions for the purpose of producing the load-relief current.

Also connected in parallel with the arrangement comprising the starting transformer 15 and the lamp 16 is a switch 23 in series with a parallel circuit comprising a capacitor 24 and a resistor 25. This circuit serves the purpose of assisting the starting of the lamp 16.

The DC voltage present between the output lines 7, 8 is isolated via the capacitor 14 which is charged to half the DC voltage. As a result, the amplitude of the AC voltage occurring between the circuit points 26, 27 likewise assumes only half the value of the DC voltage. The value of this voltage does not ensure reliable starting of the lamp 16.

In order to assist starting, the switch 23 is closed for the starting operation. The capacitor 24 forms, with the ballast inductance 17, a resonant circuit and is dimensioned such that the resonant frequency of the resonant circuit comprising the ballast inductance 17 and the capacitor 24 is at a higher harmonic of the switching frequency of the semiconductor switches 10, 11. As a result, a harmonic voltage of the ballast inductance 17 is added to the square-wave voltage of the semiconductor switches 10, 11 which is present between the connecting point 18 and the circuit point 27, with the result that the voltage amplitude required for reliably forming the arc directly after starting the lamp 16 is achieved.

The tuning of the series resonant circuit formed from the ballast inductance 17 and the capacitor 24 to a higher harmonic, preferably the fifth harmonic, guarantees, in conjunction with the damping owing to the parallel resistor 25, that the semiconductor switches 10, 11 are not subjected to an overcurrent as would be the case if the resonant circuit comprising the ballast inductance 17 and the capacitor 24 were to be set directly at the resonant frequency of the switching frequency of the semiconductor switches 10, 11.

It is also possible for other harmonics than the fifth harmonic, for example the third harmonic, to be used for specific embodiments of the invention. The criterion for selecting the harmonic consists in reliably setting the desired voltage increase without the risk of subjecting the semiconductor switches 10, 11 to an overcurrent.

Not shown in the schematic circuit diagram is the possibility of the entire ballast device being disconnected when the current flow measurement, for example using the sensor 13, shows that the no-load condition for a specific minimum period, for example a few seconds, is maintained. As a result, it is possible for the auxiliary inductance 21 to be dimensioned to be small in terms of physical volume, since it only needs to carry out the load-relief function for a limited period of time.

The invention claimed is:

1. A ballast device for a discharge lamp comprising:
   a DC voltage supply stage;
   semiconductor switches being switched at a radiofrequency clock frequency so as to change the current direction through the discharge lamp;
   a starting transformer;
   a series capacitor through which a DC voltage of said DC voltage supply stage is supplied to the starting transformer, and
   a ballast inductance connected to an electrode of the discharge lamp which is not connected to the starting transformer,
   wherein
   there is a first connecting point between the series capacitor and the starting transformer,
   there is a second connecting point between the discharge lamp and the ballast inductance,
   a capacitor is connected in series with a switch between the first and second connecting points, said capacitor forms a series resonant circuit with the ballast inductance, and said series resonant circuit is tuned to a higher harmonic of the clock frequency.

2. A ballast device as claimed in claim 1, wherein the series resonant circuit is tuned to the third to sixth harmonic of the clock frequency.

3. The ballast device as claimed in claim 1, wherein a resistor is connected in parallel with the capacitor.

* * * * *